United States Patent [19]
Barthelemy et al.

[11] Patent Number: 4,588,593
[45] Date of Patent: May 13, 1986

[54] PROCESS FOR PREPARING CHEESE AND PRODUCT PRODUCED

[75] Inventors: Pierre Barthelemy, Barbery; Michel Desmazeaud, Bures-sur-Yvette, both of France

[73] Assignee: Roussel Uclaf, Paris, France

[21] Appl. No.: 489,312

[22] Filed: Apr. 28, 1983

[30] Foreign Application Priority Data

Apr. 30, 1982 [FR] France ............................. 82 07484

[51] Int. Cl.⁴ .............................................. A23C 9/12
[52] U.S. Cl. ....................................... 426/36; 426/40; 426/42
[58] Field of Search ............................. 426/36, 38, 42

[56] References Cited

PUBLICATIONS

Feuillat et al–Lait–vol. 519 and 520, Nov.–Dec., 1972, pp. 629–641.
Desmazeaud et al—Chem. Abst. vol. 70 (1969), p. 111743j.

Primary Examiner—Sam Rosen
Attorney, Agent, or Firm—Bierman, Peroff & Muserlian

[57] ABSTRACT

A process for improving the cheese capacity of milk used in the preparation of uncooked or half-cooked pressed paste cheeses comprising adding to the milk during the course of the preparation of said uncooked or half-cooked pressed paste cheeses, an enzyme extracted from a culture of *Micrococcus caseolyticus;* and the uncooked or half-cooked pressed paste cheese prepared thereby.

9 Claims, No Drawings

PROCESS FOR PREPARING CHEESE AND PRODUCT PRODUCED

STATE OF THE ART

The present invention relates to a process for improving the cheese capacity of milk used in the preparation of uncooked or half-cooked pressed paste cheeses; as well as the cheese obtained by this process.

It is known that the techniques followed in collecting milk, preserving it at the farm at low temperatures, transporting it by tank truck and holding it at the creamery in isothermal tanks, have the gravest consequences on the bacterial flora whose activity is essential for the production of a quality cheese. The holding of milk at 4° C. or a higher temperature particularly has an effect of favoring the development of psychrotrophic bacteria which produce enzymes harmful to the quality of the cheese. The increase of these psychrotrophic bacteria occurs to the detriment of other flora which produce peptides stimulating the increase of lactic bacteria which are indispensible to the preparation of cheeses of good quality.

The production of cheeses is described, for example, in U.S. Pat. Nos. 2,793,122; 3,156,568 and 4,158,607; as well as in Swiss Pat. No. 345,318 and Moreno et al, J. of Dairy Sci. 56, p. 33–38 (1973), "Le Lait" 52, (1972), p. 629–641 and C. A. 62 (1965) 13765c. In these processes starter cultures are employed such as those from *Micrococcus caseolyticus*. In Chem. Abstracts 70, (1969) 111743 j, a cheese process is described using an enzyme extracted from a culture of *Micrococcus caseolyticus* to produce a cooked pressed paste cheese.

OBJECTS OF THE INVENTION

An object of the present invention is to determine how to recover the cheese capacity of milk comparable to that which existed in former times.

Another object of the present invention is the development of a process for improving the cheese capacity of milk used in the preparation of uncooked or half-cooked pressed paste cheeses comprising adding to the milk during the course of the preparation of said uncooked or half-cooked pressed paste cheeses, an enzyme extracted from a culture of *Micrococcus caseolyticus*.

These and other objects of the invention will become more apparent as the description thereof proceeds.

DESCRIPTION OF THE INVENTION

During the course of research to determine how to recover the cheese capacity of milk, we unexpectedly found that the addition of an enzyme extracted from a culture of *Micrococcus caseolyticus* considerably improved the cheese capacity of milk used in the preparation of uncooked or half-cooked pressed paste cheeses.

While it is known from Chem. Abst. 70, (1969), p. 23 111743j that enzymes extracted from a culture of *Micrococcus caseolyticus* could be employed in the manufacture of cooked pressed paste cheeses, the use of the extracted enzymes in the preparation of uncooked or half-cooked pressed paste cheeses could not have been anticipated.

The addition to the milk of enzymes extracted from a culture of a strain *Micrococcus caseolyticus* answers particularly well the problems posed in non-uniform handling of the milk. On the one hand, it acts to prepare or to complete the action of rennet in improving the capacity of coagulation of the milk and, on the other hand, it acts to create, by splitting of the casein, some peptides stimulating the latic bacteria. Because of this enzyme addition, the cheesemaker can recover a milk having a traditional cheesemaking capacity by a reconstitution of its biological maturation processes.

According to the invention, a uncooked or half-cooked pressed paste cheese is a dried crusted cheese having a dried extract weight of 50% to 55% of the finished cheese weight. Such dried crusted cheeses having a dried extract weight of 50% to 55% are particularly cheeses such as Gouda, Saint-Paulin, Edam, Tome, green-spotted pasty cheeses, etc.

In conducting the process of the invention, all *Micrococcus caseolyticus* strains can be employed. However, the strain deposited in the Collection Nationale de Cultures de Microorganismes (C.N.C.M.) of the Pasteur Institute in Paris under No. I. 194 on Apr. 28, 1982, has been found to be particularly advantageous. This strain is identical to the strain deposited in the collection of C.N.R.Z. (Centre National de Recherches Zootechniques at Jouy-en-Josas, France) under No 467, which has, in addition, already been described in the literature.

The process of the invention is advantageously characterized in that the *Micrococcus caseolyticus* strain employed is that deposited at the Pasteur Institute of Paris, France under No. I. 194.

According to the invention, the addition of enzymes in the preparation of uncooked or half-cooked pressed paste cheeses causes acceleration and regularization of the proteolysis while giving to these cheeses a better texture. This enzyme addition principally has the effect of improving the texture of the paste and of prolonging the period of commercialization beyond the usual duration, without causing bitterness as can occur with certain enzymes.

The process of the invention is characterized in that the addition of the enzyme is made at a dosage of between 25 and 250 U/liter of milk. Under the preferred conditions of the operation of the process of the invention, the enzyme addition is made at a dosage of between 70 and 150 U/liter of milk. The enzyme increases the capacity of coagulation of the milk and the optimum dosage is that which shortens the time of coagulation on the order of from 3 to 5 minutes. This dosage, which varies as a function of the quality of the milk and of cheeses to be prepared, is situated most often in the neighborhood of 100 U/liter of milk.

The proteolytic activity of the enzyme is determined by measurement (variation of the optical density at 275 nm) of the amount of casein hydrolyzed by the enzyme (nitrogen-containing fraction non-precipitable by trichloroacetic acid) under standard conditions.

One unit (U) is defined as the amount of enzyme which, acting under the conditions of the dosage, causes a variation of the optical density at 275 nm of 0.001 unit of optical density per minute per milliliter of solution.

According to the process of the invention, the addition of the enzyme is made before or during the rennet treatment. This enzyme addition is preferably made some 15 to 30 minutes before the rennet treatment under the condition where the milk temperature is equal or greater than 35° C. In the case where the temperature of the rennet treatment is only in the order of 30° to 32° C., the temperature least favorable to the activity of the enzyme, this must be introduced at least 40 minutes before the rennet treatment.

In the case where the techniques of cheesemaking does not allow the maintaining of this preliminary contact time, the enzyme can be introduced in the milk prematuration tank starting from the eve of the day of cheesemaking (milk at a temperature generally between 10° and 16° C.), or in the storage tank (milk at 4° C.) when the technique of prematuration is not utilized.

Another technique can be applied in the case where the milk of these tanks has undergone a pasteurization (72° C.) or a thermization (63° C.) just before starting the cheesemaking. In order to avoid the partial or total destruction of the enzyme by heat, the technique consists in diluting the total quantity of enzyme, utilizing, for example, for this treatment, for a tank of 10,000 liters, from 700,000 to 1,500,000 units, in one liter of sterile milk, the day before the cheesemaking. This enzymatic predilution or preparation is kept at room temperature of about 20° C. The enzymatic preparation is next poured into the cheese making tank at the start of filling the same.

This technique consequently causes the total hydrolysis of the casein contained in the liter of milk, being about 26 gm, thus giving an equivalent amount of stimulating supplementary peptides reinforcing the normal action of the enzyme which remains intact in this preparation.

According to a variant in the process of the invention, the enzyme addition is made during the course of stirring.

The technique of preparation of uncooked or half-cooked pressed paste cheeses being known in itself, the following examples are given only to illustrate the addition of enzymes extracted from a culture of *Micrococcus caseolyticus*.

The invention also relates to the uncooked or half-cooked pressed paste cheese obtained by the process described above.

It is pointed out that the process of the invention can be employed starting from entire natural milk as well as starting from reconstituted, recombined or ultrafiltered milk. The process of ultrafiltration is not without inconvenience for the production of a quality cheese. While retaining all the proteins and mineral salts of which a part was previously lost with the serum, the ultrafiltration contributes in obtaining a cheese most difficult to ripen and in changing its organoleptic characteristics.

The addition of the enzymes extracted from a culture of *Micrococcus caseolyticus* allows the alleviation of these major inconveniences. The invention, therefore, also relates to the application of an enzyme extracted from a culture of *Micrococcus caseolyticus* such as defined above to the preparation of uncooked or half-cooked pressed paste cheeses.

The enzyme extracted from a culture of *Micrococcus caseolyticus,* as used in the process of the invention, can be prepared, for example, according to the technique described in Ann. Biol. Anim. Bioch. Biophys. 8 (1968), 565–577 and 10 (1970) 413–430.

This extracted enzyme from *Micrococcus caseolyticus* can be prepared starting from a broth of the culture of *Micrococcus caseolyticus* by centrifugation of the said broth in order to eliminate the bacteria. The enzyme is then taken up in a solution of calcium chloride and concentrated by ultrafiltration followed by a lyophilization.

This preparation is set out in the following.

PREPARATION OF THE FERMENTATION BROTH

A solution of 750 liters of water, 20 kg of corn steep liquor, 20 kg of casein peptone, 10 kg of yeast autolysate and 0.906 kg of calcium chloride was prepared in a fermenter and adjusted to a pH of 7 by addition of sodium hydroxide solution. The solution was sterilized at 120° C. and the temperature of the sterile media was brought to 30° C. Then, 15 liters of a sterile 30% solution of dextrose and 10 liters of a bottoms broth of a culture of *Micrococcus caseolyticus* (I. 194) was introduced therein. The culture broth was allowed to ferment for 24 hours at 30° C. while agitating and passing in sterile air, while maintaining the pH constant for the first ten hours. After 24 hours, 1050 liters of raw fermentation broth was recovered.

EXTRACTION OF THE ENZYME

The bacteria contained in 5000 liters of culture broth prepared as above was separated by centrifuging in an Alfa Laval centrifuge type LX. 4770 liters of a limpid centrifugate was recovered.

2670 kg of ammonium sulfate was added to this obtained centrifugate and the media was agitated for 30 minutes, followed by addition of 1.2 kg of Hyflo-supercel. The treated centrifugate was then allowed to stand for 24 hours and the supernatant was separated. The insoluble fraction obtained above was introduced into 330 liters of a calcium chloride solution, agitated for 15 minutes and then filtered. 390 liters of solution were recovered and concentrated by ultrafiltration. After 12 hours, 50 liters of a concentrated solution of enzymes were obtained analyzing 50,500 Units/cm$^3$. This concentrated solution of enzymes was then separated into flasks of 24 cm$^3$ volume and lyophilized.

The following examples are illustrative of the practice of the invention without being limitative.

EXAMPLE 1

Preparation of a Cheese of the "Gouda" Type 100 liters of entire milk previously pasteurized at 72° C. for 20 minutes was inoculated with some congealed ferments (leavening agent). A maturation of 16 hours at 11°–12° C. was made, then the enzyme extracted from a strain of *Micrococcus caseolyticus* (deposited in the Pasteur Institute in Paris under No. I. 194) was introduced therein at a dosage of 90 Units per liter of milk. Fifteen minutes later, the rennet treatment was made. After coagulation, the serum was eliminated. A first mashing was made, followed by a thermal treatment at 40° C. The coagulum was partially freed of lactose by addition of water, followed by a second mashing. The drained coagulum was recovered, molded and pressed according to the usual process.

The cheeses were then enrobed with wax and ripening was conducted at 12° C. and 95% relative humidity for 90 days. Cheeses of the "Gouda" type weighing 250 gm were obtained.

Simultaneously with the above preparation, cheeses without the addition of enzyme were prepared by the same process. Tests showed that the texture of the "treated" cheeses was much more regular than that of the "control" cheeses.

EXAMPLE 2

Study of the Action of the Enzyme

In order to study the action of the enzyme during the preparation of uncooked or half-cooked pressed paste cheeses, according to the invention, the action of the enzyme was studied while considerably increasing the dosage utilized. For this study, the following protocol was utilized:

87 liters of entire milk previously pasteurized at 72° C. for 20 minutes were inoculated with a congealed ferment (leavening agent). A maturation of 16 hours at 11°–12° C. was made, then 4500 Units of enzyme extracted from a culture of a strain of *Micrococcus caseolyticus* deposited in the Pasteur Institute at Paris under No. I. 194, was added (corresponding to about 520 U/liter of milk. Fifteen minutes later, the treatment with rennet was made.

After coagulation, the serum was eliminated. A first mashing was made, followed by a thermal treatment at 40° C. The coagulum was partially freed of lactose by addition of water, followed by a second mashing. The drained coagulum was recovered, molded and pressed according to the usual process.

The cheeses were then enrobed with wax and ripening was conducted at 12° C. and 95% relative humidity. The cheeses were removed at different periods during the course of the ripening. Cheeses of the "Gouda" type weighing about 250 gm were obtained.

Simultaneously with the above preparation, cheeses without the addition of enzymes were prepared by the same process.

Sensorial Analysis

The "treated" cheeses and the "control" cheeses were submitted to analysis by a trained tasting jury of 16 people.

The texture of the cheeses were determined according to four characteristics given values each from 0 to 4: hard, friable, slippery, onctuous. The flavor was determined according to seventeen characteristics given values each from 0 to 4 of which the principal were: bitter, acid, piquant, degree of ripening.

No flaw of bitterness could be detected in the "treated" cheeses during the course of 90 days of ripening. For the other flavor characteristics tested, no significant differences were observed except as regards the level of appreciation of the degree of ripening (the "treated" cheeses were considered as riper at the end of the maturation.)

With respect to the texture, the "treated" cheeses were considered as more "friable" after 28 days of maturation and "less hard" after 90 days of maturation.

Measurement of the Texture

The variations of texture in the "treated" cheeses and the "control" cheeses during the course of the period of ripening were determined by the flow test with the aid of an apparatus described in "Le Lait" 56, p. 486–494. The "module of viscosity" and the "module of elasticity" were measured on cylindrical probes (diameter 2 cm, height 2 cm).

Rheological measurements showed a clear difference in the evolution of the texture.

For the "control" cheeses, the module of elasticity increased regularly during the course of ripening. For the "treated" cheeses, a smaller increase was observed until the fiftieth day, then a decrease was noted next until the ninetieth day.

For the "control" cheeses, the module of viscosity increased rapidly between the first and the fourteenth day, then more slowly in the following days. For the "treated" cheeses, the evolution of the module of viscosity was analogous to that of the "control" cheeses up to the fourteenth day. A clear diminution was observed on the twentyfourth day, there a slight increase next until the end of the ripening period was observed.

In conclusion, these tests show that the addition of enzymes extracted from a culture of *Micrococcus caseolyticus* at a dosage very much higher than the normal dosage utilized manifests a very important proteolysis of the cheeses which is not accomplished by bitterness, contrary to that which has been noted with treatment with other enzymes.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A process for the improving the cheese capacity of milk used in the preparation of uncooked or half-cooked pressed paste cheese comprising a dried crusted cheese having a dried extract weight of 50% to 55% of the finished cheese weight comprising adding to the milk before or during rennet treatment during the course of the preparation of said uncooked or half-cooked pressed paste cheese, 25 to 250 U/liter milk of an enzyme extracted from culture of *Micrococcus caseolyticus*.

2. The process of claim 1 wherein said *Micrococcus caseolyticus* is the strain deposited in the Pasteur Institute in Paris under No. I. 194.

3. The process of claim 1 wherein the amount of said enzyme is between 70 and 150 U/liter of milk.

4. The process of claim 1 wherein the addition of said enzyme is made 15 to 30 minutes before the rennet treatment where said rennet treatment is made at a temperature of about 35° C.

5. The process of claim 1 wherein the addition of said enzyme is made at least 40 minutes before the rennet treatment where said rennet treatment is made at a temperature of 30° to 32° C.

6. The process of claim 1 wherein the addition of said enzyme is made to the milk in the prematuration tank or storage tank.

7. The process of claim 1 in the case where the milk has undergone a pasteurization or a thermization before starting cheese making, the enzyme is diluted into some sterile milk the day before the cheese making, then kept at room temperature, and then poured into the cheese making tank at the start of filling the same.

8. The process of claim 1 wherein said enzyme is added to said milk during stirring.

9. The uncooked or half-cooked pressed paste cheeses produced by the process of claim 1.

* * * * *